United States Patent [19]

Tran et al.

[11] Patent Number: 5,502,414
[45] Date of Patent: Mar. 26, 1996

[54] CIRCUIT FOR DELAYING DATA LATCHING FROM A PRECHARGED BUS AND METHOD

[75] Inventors: Thang Tran; Gopi Ganapathy; Michael D. Goddard; Robert Thaden, all of Austin, Tex.

[73] Assignee: Advanced Micro Devices, Inc., Sunnyvale, Calif.

[21] Appl. No.: 422,617

[22] Filed: Apr. 13, 1995

Related U.S. Application Data

[63] Continuation of Ser. No. 6,731, Jan. 21, 1993, abandoned.

[51] Int. Cl.$^6$ ................................................. H03K 17/687
[52] U.S. Cl. ........................... 327/434; 327/91; 327/387; 327/389; 327/394
[58] Field of Search ..................... 307/480, 481, 307/572, 575, 584; 327/91, 379, 387, 389, 392, 394, 427, 434, 202, 203, 215, 218; 326/95, 98, 113

[56] References Cited

U.S. PATENT DOCUMENTS

| | | | |
|---|---|---|---|
| 3,662,113 | 5/1972 | Von Recklinghausen | 327/387 |
| 3,764,921 | 10/1973 | Huard | 327/387 |
| 3,897,774 | 8/1975 | Burdick et al. | 327/387 |
| 4,139,851 | 2/1979 | Risko | 327/76 |
| 4,323,796 | 4/1982 | Lathrope | 327/387 |
| 4,488,066 | 12/1984 | Shoji | 327/141 |
| 4,577,124 | 3/1986 | Koike | 326/113 |
| 4,585,958 | 4/1986 | Chung et al. | 307/481 |
| 4,618,786 | 10/1986 | Johnson | 307/481 |
| 5,059,823 | 10/1991 | Ahsanullah | 307/572 |
| 5,087,840 | 2/1992 | Davies et al. | 307/480 |
| 5,093,588 | 3/1992 | Ando et al. | 326/86 |
| 5,111,063 | 5/1992 | Iwata | 307/480 |
| 5,122,675 | 6/1992 | Moxon | 307/480 |
| 5,128,557 | 7/1992 | Milby et al. | 327/314 |
| 5,155,393 | 10/1992 | Gongwer et al. | 307/480 |
| 5,164,612 | 11/1992 | Kaplinsky | 327/203 |
| 5,194,768 | 3/1993 | Lozano | 327/387 |
| 5,216,292 | 6/1993 | Imazu et al. | 326/114 |
| 5,225,723 | 7/1993 | Drako et al. | 307/480 |
| 5,289,062 | 2/1994 | Wyland | 307/571 |

FOREIGN PATENT DOCUMENTS

| | | | |
|---|---|---|---|
| 0304711 | 12/1988 | Japan | 307/572 |
| 0006120 | 1/1991 | Japan | 307/572 |
| 0068711 | 3/1992 | Japan | 307/572 |
| 2199712 | 7/1988 | United Kingdom | 307/572 |

*Primary Examiner*—Terry Cunningham

[57] ABSTRACT

An latch circuit includes an input line receiving electrical signals from a bus, a latch for conducting electrical signals from the precharged bus to a receiving circuit, and a structure for enabling the latch only when data is driven onto the bus.

3 Claims, 3 Drawing Sheets

CIRCUIT FOR DELAYING DATA LATCHING FROM A PRECHARGED BUS AND METHOD

CROSS REFERENCES TO RELATED APPLICATIONS

This application is a continuation of application Ser. No. 08/006,731, filed on Jan. 21, 1993, now abandoned.

This application is related to the following U.S. patent applications:

| SERIAL NO. | TITLE | INVENTOR |
|---|---|---|
| (06940/0028) | Combination Prefetch Buffer and Instruction Cache | Tran |
| (06940/0053) | Dram Access System and Method | Johnson et al. |
| (06940/0054) | Data Cache Reloading System and Method | Johnson et al. |

The above listed applications are all filed on even date herewith, are all assigned to the assignee of this invention, and are all hereby incorporated herein by reference as if reproduced in their entirety herein.

BACKGROUND OF THE INVENTION

1. Field of the Invention

The present invention relates to digital circuits and more specifically, to power saving features in precharged bus circuitry.

2. History of the Prior Art

As is generally known to those skilled in the art of digital circuit design, the amount of circuitry required for a bus used for data transfer may be reduced by use of a precharged bus design rather than a non-precharged bus design. Typically, a precharged bus is a bus operated in conjunction with a multi-phase clock, on which data may be driven during a data-drive phase, and which is precharged to a precharge level (i.e., VDD) during a precharge phase. Those skilled in the art, however, have heretofore encountered problems in using the precharged bus when data is latched from the precharged bus to a receiving circuit. One problem has been that during a data-drive phase, precharge signals may be conducted to the receiving circuit through a latch that is enabled before the precharged bus is driven with valid data. Another problem has been that the receiving circuit may receive precharge signals in a data-drive phase during which no data is to be driven on the precharged bus. The propagation of precharge signals through the receiving circuit, "precharge rippling", may result in unnecessary transitions and invalid data at the output of the receiving circuit. The unnecessary transitions cause excess power consumption and additional noise.

Based on the foregoing, it should be perceived that the use of a precharged bus decreases the amount of circuitry required. The use of a precharged bus, however, can result in precharge rippling through the receiving circuit which increases power consumption. There has not heretofore been developed a means or method for eliminating precharge rippling. Accordingly, it should be perceived that it is a shortcoming and deficiency of the prior art that such an apparatus or method has not yet been developed.

SUMMARY OF THE INVENTION

The present invention overcomes the shortcomings and deficiencies of the prior art by providing a latch circuit for delaying the latching of data from a bus to a receiving circuit. The latch circuit of the present invention includes an input line for receiving data from the bus, a latch for conducting electrical signals from the bus to the receiving circuit, and a structure for enabling the latch only when data is being driven on the bus during a data-drive phase. The structure for enabling may include a data-clock signal that indicates a data-drive phase, a data-valid signal that is asserted when data is driven on the bus and a control circuit responsive to the data-valid signal and the data-clock signal, the control circuit for delaying the enabling of the latch during a data-drive phase until data is driven on the bus.

The data-valid signal may possess the same timing as the data driven on the bus, and in some embodiments of the present invention may be conducted on an extra line of the bus. The extra line may be driven by a circuit of the same design as the circuit used to drive the data lines of the bus, and may also have the same loading as the data lines. In some embodiments of the present invention, an enable signal which enables data to be driven onto the data lines may also be used to enable the assertion of the data-valid signal on the extra line.

In certain embodiments of the present invention, the latch circuit also includes a structure for delaying the enabling of the latch until some time after data is driven onto the bus. The structure may include at least one inverter connected in series between the extra line carrying the data-valid signal and the control circuit input.

Furthermore, the present invention provides an apparatus for controlling the receiving of data by a receiving circuit from a precharged bus, the apparatus including an input line for receiving data from the precharged bus, a latch for conducting electrical signals from the input line to the receiving circuit, and an enabling means for enabling the latch such that precharge values are not conducted to the receiving circuit.

Still furthermore, the present invention provides a method for delaying the latching of data from a bus to a receiving circuit. This method provided by the present invention includes the steps of indicating when data may be driven onto the bus, generating a data-valid signal that is asserted only when data is driven onto the bus, and latching electrical signals from the bus to the receiving circuit only when data may be driven onto the bus and the data-valid signal is asserted.

Still furthermore, the present invention provides a method for preventing the receipt of precharge values by a receiving circuit from a precharged bus. The method provided by the invention includes the steps of generating a data-clock signal that indicates the timing of data-drive phases and precharge phases, asserting an indicator signal when data is being driven on the precharged bus, combining the data-clock signal and the indicator signal into an enable signal, the enable signal being asserted when data is being driven on the precharged bus during a data-drive phase, and enabling the conduction of electrical signals from the precharged bus to the receiving circuit only when the enable signal is asserted.

Accordingly, it is an object of the present invention to provide a latch circuit which delays the latching of electrical signals from a bus to a receiving circuit until data is driven on the bus.

Another object of the present invention is to provide a latch circuit for preventing the conduction of precharge signals from a precharged bus to a receiving circuit.

It is yet another object of the present invention to prevent unnecessary transistor switching within a receiving circuit and incorrect data at its output caused by precharge rippling.

Yet another object of the present invention is to reduce power consumption and noise in an electrical system in which data is transferred by a precharged bus.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION

Figure 1:
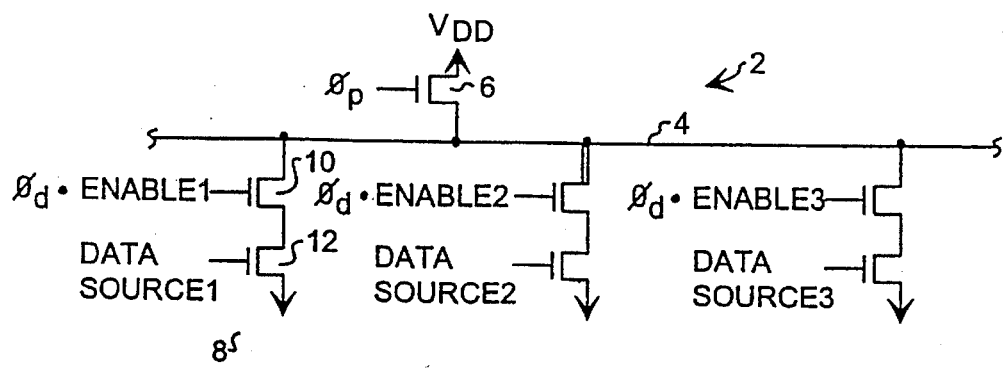
FIG. 1 is a circuit diagram of a typical precharged bus, according to known principles of circuit design.

Referring now in detail to the drawings, there is shown in FIG. 1 an example of one bit line of a precharged data bus as is generally known to those skilled in the art of logic design. The bit line 2 consists of a data line 4, a pull-up transistor 6, and a bus driver 8 for each source of data. Each driver 8 has two transistors 10 and 12 in series. The precharged data bus operates in conjunction with a multi-phase clock such that the bus may be precharged (i.e., pulled to a high level) during a precharge phase, and may be driven with data during a data-drive phase. The gate of pull-up transistor 6 is connected to a precharge phase indicator (shown in FIG. 1 as $\phi_p$) such that during every precharge phase, pull-up transistor 6 turns on and pulls the data line 4 up to VDD. The gate of transistor 10 receives a data-drive phase indicator (shown in FIG. 1 as $\phi_d$) ANDed with a driver enabling signal (ENABLEn) such that transistor 10 is turned on during a data-drive phase if that particular driver has been enabled. The gate of transistor 12 receives the data to be driven (DATAn) such that transistor 12 is turned on if the data is TRUE, and is turned off if the data is FALSE. Thus, it may be seen that the precharged bus in FIG. 1 uses negative logic. If the data is TRUE, the bus is pulled to a low level (VSS). If the data is FALSE, the bus is tri-stated and retains its precharge value of VDD.

As can be seen from FIG. 1, the drivers required for such a precharged bus need only include two series transistors. A non-precharged bus, however, typically requires the driver from each source of data to include a sourcing transistor, a sinking transistor, and a method for disabling both transistors. Thus, it can be seen that the use of a precharged bus reduces the number of transistors needed in the driver for each source of data and, therefore, reduces the design cost.

Figure 2:
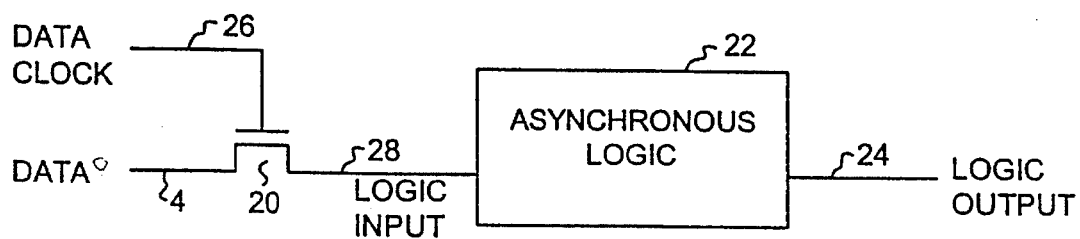
FIG. 2 is a circuit diagram of an application of the precharged bus shown in FIG. 1.

Although the use of a precharged bus can result in significant cost savings, the benefits of such use have been diminished by problems associated with latching data from the precharged bus to a receiving circuit. Shown in FIG. 2 is an example of a precharged bus used in conjunction with a receiving circuit. The example includes data line 4 of a precharged bus, a MOSFET transistor 20, and an asynchronous logic 22 as a receiving circuit. The data line 4 is connected to the input of MOSFET transistor 20. The gate of latch 20 is controlled by the DATA CLOCK signal which is high during each data-drive phase and low during each precharge phase. The output of MOSFET transistor 20 is conducted on line 28 and received as LOGIC INPUT by the asynchronous logic 22. In response to LOGIC INPUT, the asynchronous logic 22 generates a LOGIC OUTPUT on line 24.

When DATA CLOCK is low, the MOSFET transistor 20 is disabled and the signal on data line 4 is not received by the asynchronous logic 22. When DATA CLOCK is high, MOSFET transistor 20 is enabled and allows the signal on data line 4 to pass through the latch 20 and be received by the asynchronous logic 22. It should be noted here that DATA CLOCK indicates when data may be driven on the bus, but does not necessarily indicate that data is being driven on the bus. During any particular data-drive phase, data is usually not driven on the bus until some time after the low-to-high transition of DATA CLOCK. During the time that DATA CLOCK is high and before data is driven onto the bus, the bus remains at its precharge level. Thus, when DATA CLOCK is high, the precharge signal conducted on data line 4 may be latched into and propagate through the asynchronous circuit. This precharge rippling may cause unnecessary transistor switching in the asynchronous circuit and may therefore cause excess power consumption and additional noise. Also, the precharge rippling may cause invalid data to appear as LOGIC OUTPUT on line 24.

Figure 3:
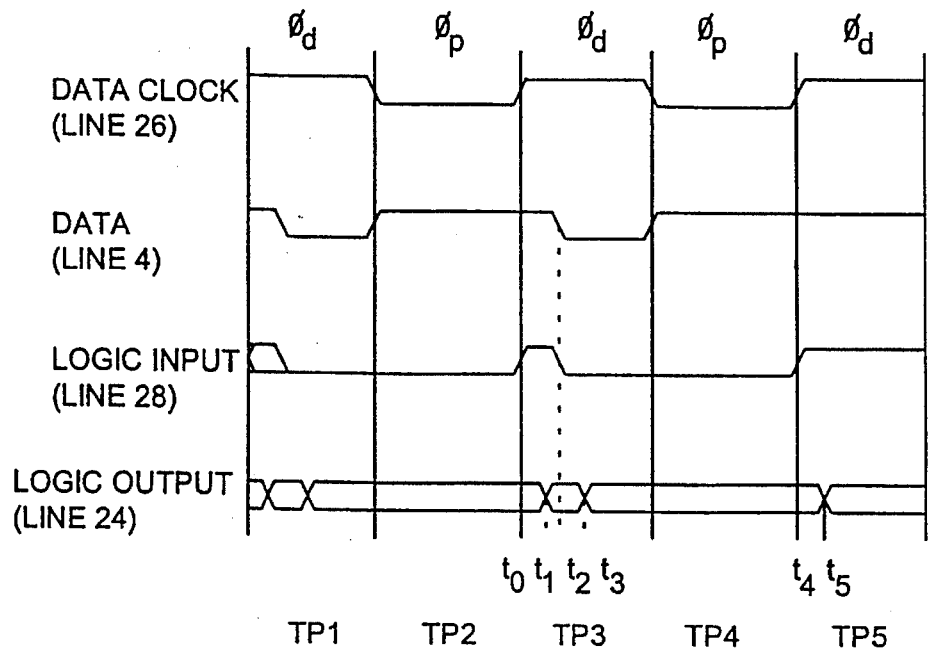
FIG. 3 is a timing diagram useful in explaining the operation of the circuit shown in FIG. 2.

These problems encountered with the use of a precharged bus in the application shown in FIG. 2 may best be explained by referring to the timing diagram shown in FIG. 3. DATA CLOCK is driven high during the data-drive phase (indicated by $\phi_d$) and low during the precharge phase (indicated by $\phi_p$). During the precharge phases (TP2 and TP4 in FIG. 3), the data bus is precharged to a high level (VDD). During each data-drive phase, a data source may drive data onto the data line 4, which data may be latched into functional blocks such as the asynchronous logic 22 shown in FIG. 2, and used for operation or calculation by that functional block. In FIG. 3, it is assumed that data is being driven during periods TP1 and TP3. It is possible, however, that no data is driven by any source during a data-drive phase, as shown in period TP5, in which case the data bus will remain at the precharge value of VDD.

During TP1, a low signal is driven on the data line 4 and ripples through the asynchronous logic 22 resulting in a change in LOGIC OUTPUT on line 24. The asynchronous logic and its output then remains unchanged until time $t_0$ when DATA CLOCK is driven high enabling MOSFET transistor 20. Because DATA CLOCK enables latch 20 while the data bus still retains its precharge value, the input to the asynchronous logic 22 (LOGIC INPUT) transitions from low to high at time $t_0$. The precharge value then propagates through the asynchronous logic. This precharge rippling may result in the switching of transistors within the asynchronous logic and a change in LOGIC OUTPUT shown in FIG. 3 as occurring at time $t_1$. Valid data does not appear as LOGIC INPUT until time $t_2$, after which time the valid data propagates through the asynchronous logic resulting in a correct LOGIC OUTPUT at time $t_3$. The switching of transistors within the asynchronous logic from the time the precharge value is received ($t_0$), until the time the valid data is received ($t_2$) is unnecessary and results in excess power consumption. Also, the value appearing as LOGIC OUTPUT between times $t_1$ and $t_3$ is a result of the precharge rippling and may be invalid.

Another instance of undesirable precharge rippling may occur when no data is driven onto the data bus during a data-drive phase, as shown in the period TP5 in FIG. 3. By the beginning of TP5, the asynchronous logic has responded to the data that was driven during TP3. At time $t_4$, MOSFET transistor 20 is enabled by DATA CLOCK going high, and the precharge value is received by and ripples through the asynchronous logic 22 which may cause LOGIC OUTPUT to change at time $t_5$. This change in the asynchronous logic 22 is also unnecessary and power consuming, and results in invalid data appearing as LOGIC OUTPUT.

Based on the foregoing, it should be perceived that the use of a precharged bus decreases the amount of circuitry required. The use of a precharged bus, however, can result in precharge rippling through a receiving circuit such as asynchronous logic 22 which increases power consumption and results in invalid data appearing at the output of the receiving circuit.

It should be noted here that although this and subsequent examples utilize a two-phase clock, the precharged bus may utilize any multi-phase clock.

Figure 4:
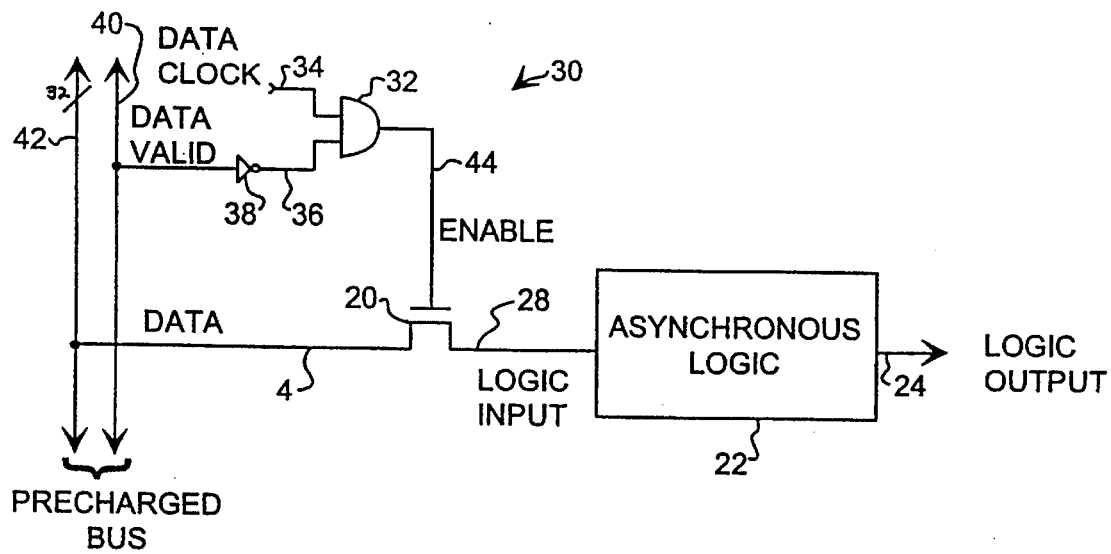
FIG. 4 is a circuit diagram of a latch circuit constructed in accordance with the principles of the present invention.

Shown in FIG. 4 is an example of a latch circuit 30 designed in accordance with the principles of the present invention for delaying the latching of signals from a precharged bus to a receiving circuit, thereby preventing the latching of precharge signals which causes undesirable precharge rippling. Data from the precharged data bus is conducted on data line 4. MOSFET transistor 20 has an input connected to data line 4 and an output connected to a receiving circuit, labeled in FIG. 4 as asynchronous circuit 22. The gate of MOSFET transistor 20 is connected to the output of a structure for enabling the latch so that precharge values are not conducted from the precharged bus to the asynchronous circuit 22. The structure for enabling includes an AND gate 32 having an input line 34 carrying a DATA CLOCK signal, an input line 36 carrying a $\overline{\text{DATA VALID}}$ signal, and an output connected to the gate of MOSFET transistor 20. The $\overline{\text{DATA VALID}}$ signal is the output of inverter 38 which receives the DATA VALID signal. The function of inverter 38 will be explained subsequently.

As was previously discussed, the DATA CLOCK signal indicates when the precharged bus is in a data-drive phase and when it is in a precharge phase. In the example shown in FIG. 4, DATA CLOCK is high during data-drive phases, and low during precharge phases. The DATA VALID signal indicates when data is being driven on the bus. In the embodiment shown in FIG. 4, DATA VALID is low only when data is driven on the precharged bus. The inverted DATA VALID signal and the DATA CLOCK signal are received by AND gate 32 such that the output of the AND gate is high only if the precharged bus is in a data-drive phase and data is being driven on the precharged bus. Thus, even if the precharged bus is in a data-drive phase, MOSFET transistor 20 will not be enabled until valid data is actually being driven on the precharged bus. Therefore, the latch circuit of the present invention prevents the receiving of precharge values from the precharged bus to a receiving circuit such as the asynchronous logic 22.

Figure 6:
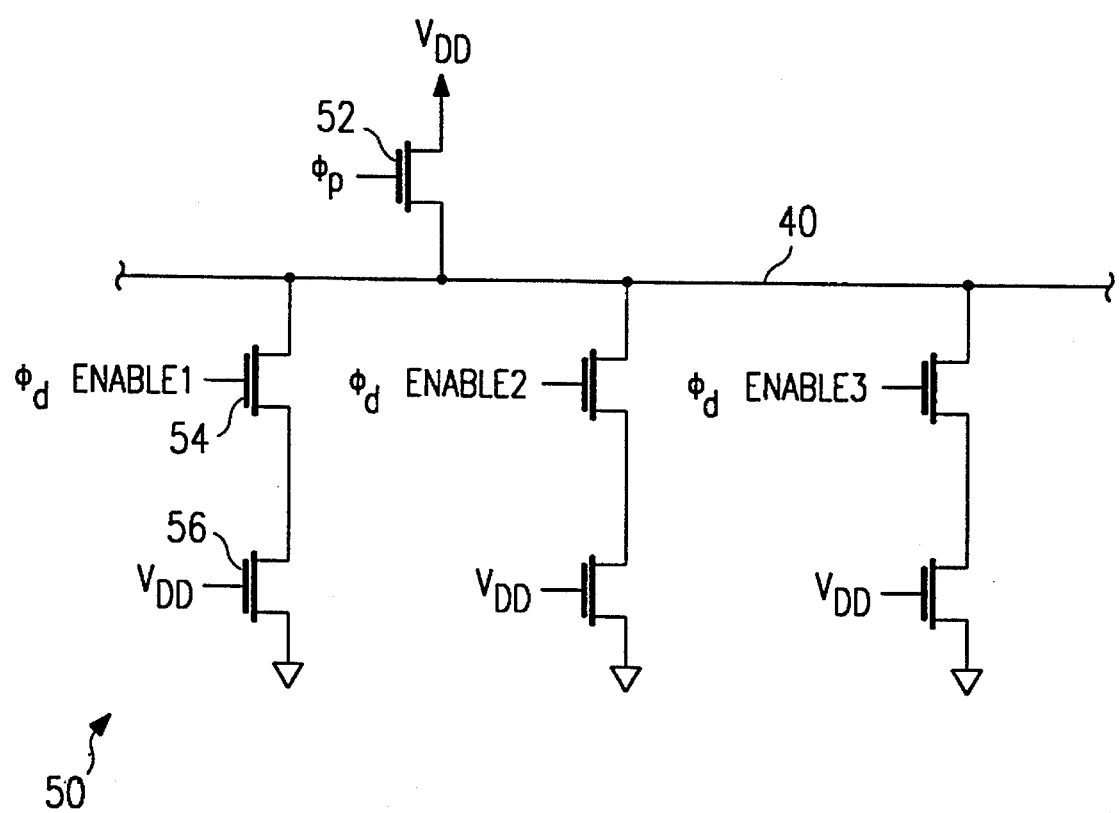
FIG. 6 is a circuit diagram of an extra bit line constructed in accordance with the principles of the present invention.

It may be preferred that the DATA VALID signal be received from an extra line 40 added to the precharged bus. The extra line 40 may be driven by a circuit of the same design as the circuits used to drive the data lines 42. For example, in a system which implements the circuit shown in FIG. 1 for driving the data lines 42, the extra line may be driven by a circuit of the same design as is shown in FIG. 6. In FIG. 6, the extra line 40 may be driven by a driver 50 or may be pulled up to VDD by pull-up transistor 52. As was the case with the circuit shown in FIG. 1, the gate of pull-up transistor 52 is connected to a precharge phase indicator such that pull-up transistor 52 turns on and pulls the extra line 40 up to VDD during every precharge phase. Each driver 50 includes a transistor 54 and transistor 56 in series. The gate of transistor 12 is tied to VDD. The gate of transistor 54 is controlled by a data-phase indicator ANDed with a driver enabling signal (ENABLEn) such that transistor 54 is turned on during a data-drive phase if that particular driver has been enabled. It should be noted that the ENABLEn signal tied to the gate of transistor 54 is the same ENABLEn signal as was shown in FIG. 1. The assertion of the ENABLEn signal causes the DATA SOURCEn signal of FIG. 1 to be driven onto the precharged bus and causes the extra line 40 of FIG. 6 to be driven low. Thus, it may be seen that the use of the same ENABLEn signal in both the circuit of FIG. 1 and the circuit of FIG. 6 reduces the chance of erroneous assertion of the DATA VALID signal. It may also be seen from FIG. 6 that when the ENABLEn signal is not asserted, the extra line 40 is tri-stated and held to a high precharge value.

It is also preferred that the extra line 40 carrying the DATA VALID signal have a loading similar to the loading of the other lines of the precharged bus. Because the data lines 42 and the extra line 40 have similar loading, the timing of the data and the DATA VALID signal will be the same. Thus, the assertion of DATA VALID will be received by latch circuit 30 at the same time that it receives valid data, thereby reducing the chance of latching precharge value, instead of valid data, into the receiving circuit.

It may be preferred in some applications of the present invention that, in order to further reduce the possibility of latching precharge value, latch 20 be enabled at some time after the data is driven onto the precharged bus. As is shown in FIG. 4, the latch circuit of the present invention may also include a structure for further delaying the latching of data from the precharged data bus to the asynchronous circuit. This structure for further delaying may include at least one inverter 38 having an input connected the extra line 40 of the precharged bus and having an output connected to the AND gate 32. The inverter 38 delays the conduction of the DATA VALID signal to the input of the AND gate which, in turn, delays the low to high transition at the output of the AND gate 32. Thus, the enabling of latch 20 is further delayed from the time that valid data appears on data line 4 until the DATA VALID signal propagates through inverter 38 and AND gate 32. This delay allows for further assurance that only valid data will be received by the asynchronous logic.

Based on the foregoing, it may be seen that the latch circuit of the present invention includes a input line such as data line 4, a latch connected between the input line and a receiving circuit, and a structure for enabling the latch such that precharge values are not conducted to the receiving circuit. The structure for enabling the latch may include an indicator signal for indicating when the precharged bus is being driven with data, a data clock signal for indicating data-drive phases, and a logic circuit that receives the indicator signal and the data clock signal and that generates an output that is asserted when the precharged bus is being driven with data during a data-drive phase. As was shown in FIG. 4, the indicator signal may be a DATA VALID signal conducted on an extra line 40 added to the precharged bus. In some embodiments of the present invention, the extra line 40 has the same loading as the other data lines 42 of the precharged bus. The logic circuit may be an AND gate 32. Also, the latch circuit of the present invention may include at least one inverter 38 connected between the extra line 40 and the AND gate 32 providing a delay between the time DATA VALID is asserted and the time DATA VALID is received by the AND gate 32.

Figure 5:
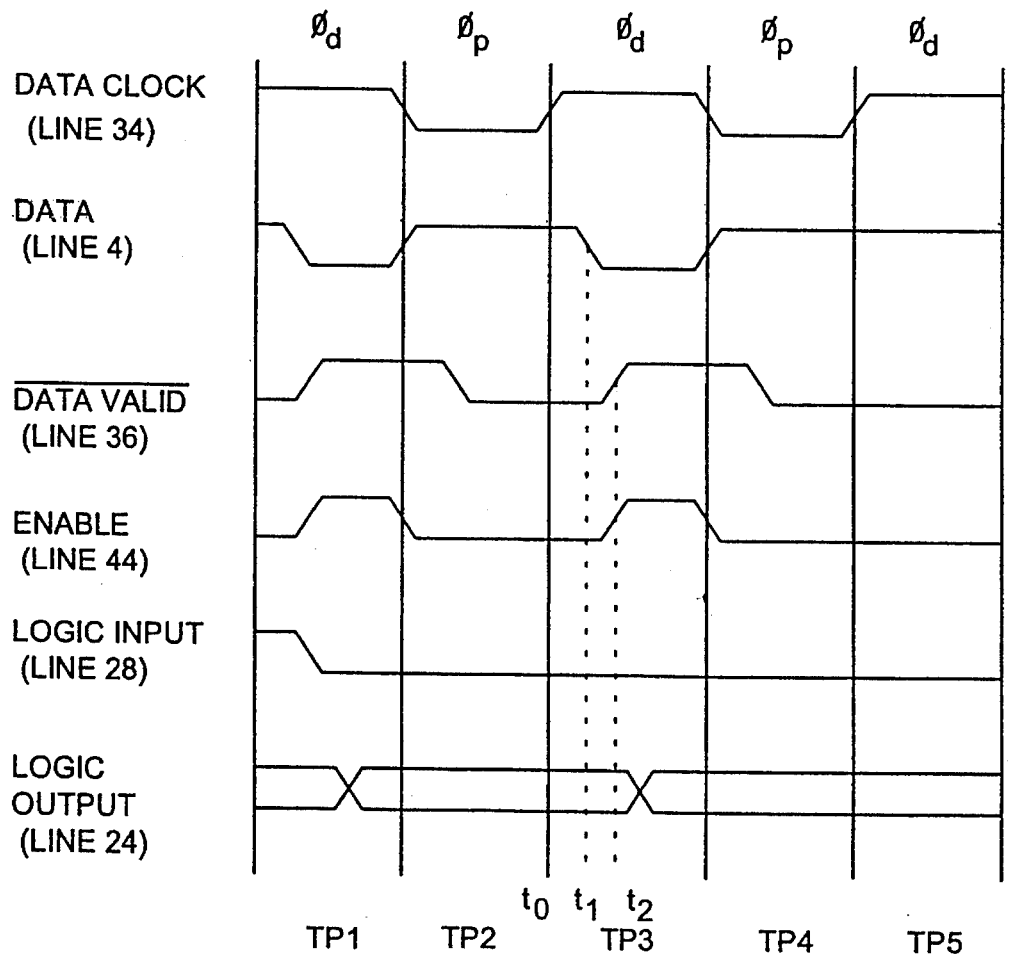
FIG. 5 is a timing diagram useful in explaining the operation of the latch circuit shown in FIG. 4.

In order to facilitate the understanding of the usefulness of the latch circuit of the present invention shown in FIG. 4, reference is now made to the timing diagram shown in FIG. 5. The timing and levels of the DATA CLOCK signal and data driven on data line 4 are the same as was depicted in FIG. 3. As was discussed previously, the DATA VALID signal indicates when valid data is driven onto a data line 4. In preferred embodiments of the present invention, the DATA VALID signal is conducted on an extra line 40 of the precharged bus and is asserted at the same time that valid data appears on the data line 4. The $\overline{\text{DATA VALID}}$ signal shown in FIG. 5 is the signal appearing at the output of the inverter 38, conducted on line 36. As can be seen from FIG. 5, the inverters 38 cause a delay between the time that DATA is driven on data line 4 and the time that the AND gate output (shown in FIG. 5 as the ENABLE signal) transitions to a high level.

As was the case in FIG. 3, during TP1 a low signal is driven on the data line 4 and propagates through the asynchronous logic 22 resulting in a LOGIC OUTPUT signal on line 24. The asynchronous logic remains unchanged at time $t_0$ when DATA CLOCK is driven high. As was discussed previously, without the use of the present invention, DATA CLOCK would at that time enable MOSFET transistor 20 while the data bus still retains its precharge value, which may result in precharge rippling and invalid data at LOGIC OUTPUT. With the use of the latch circuit, however, the enabling of MOSFET transistor 20 is delayed until valid data replaces the precharge value on the precharged bus. Referring again to FIG. 5, at time $t_1$ valid data is driven on the data line and DATA VALID is asserted on the extra line 40 of the precharged bus. The DATA VALID signal asserted on extra line 40 propagates through inverter 38 and is received by AND gate 32 as the $\overline{\text{DATA VALID}}$e signal at time $t_2$. The assertion of $\overline{\text{DATA VALID}}$ on line 36 causes the AND gate output (ENABLE) to go high which, in turn, enables MOSFET transistor 20 allowing conduction of the data from data line 4 to the asynchronous logic 22. Thus, it may be seen that the latch circuit of the present invention delays the enabling of MOSFET transistor 20 until valid data has replaced the precharge value on the precharged bus. Because the asynchronous logic does not receive precharge values, unnecessary transitions within the asynchronous logic are prevented and power consumption is reduced.

Another instance of preventing undesirable precharge rippling may be shown as occurring during period TP5 in FIG. 5. As was shown in FIG. 3, the precharge value may be received by and propagate through asynchronous logic 22 when no data is driven during a data-drive phase. With the use of the delayed latch of the present invention, however, this precharge rippling is prevented. Because valid data is not driven onto the precharged bus, the DATA VALID signal is not driven low during TP5. As a consequence, MOSFET transistor 20 is not enabled and changes that have occurred on data line 4 are not received by asynchronous logic 22, thereby preventing precharge rippling.

Based on the foregoing, it may be seen that the latch circuit of the present invention delays the latching of electrical signals from the precharged bus to a receiving circuit such that the latching of precharge values are prevented. Without the latch circuit of the present invention, precharge values may be latched into a receiving circuit when valid data follows precharge values during a data-drive phase, or when no data is driven onto a precharged bus during a data-drive phase. The propagation of the precharge value through the receiving circuit may cause unnecessary transitions within the receiving circuit and an incorrect signal at its output. The latch circuit of the present invention prevents this precharge rippling and its undesirable effects.

Obviously, numerous modification and variations are possible in view of the teachings above. Accordingly, within the scope of the appended claims, the present invention may be practiced otherwise than as specifically described hereinabove.

What is claimed is:

1. In a system in which data may be driven on a bus during a data-drive phase, a circuit for passing data from the bus to a receiving circuit, the circuit comprising:

an input line for receiving data from the bus;

a transistor having an input and an output, the input connected to the input line, and the output connected to the receiving circuit;

an enabling means coupled to said bus and said transistor for detecting valid data of a predetermined level and for turning on the transistor when valid data is present on the bus during said data-drive phase, said enabling means comprising:

a delay means, comprising at least one inverter having an input connected to a data-valid signal, for receiving and delaying said data-valid signal; and a control means, having a first input connected to an output of said inverter and a second input connected to said data-clock signal, for receiving said data-clock signal and said delayed data-valid signal and for producing a enable signal which is connected to a gate of said transistor.

2. A method of preventing the receipt by a receiving circuit of precharge values from a precharged bus, the precharged bus being driven to a precharge value during, precharge phases and being capable of being driven with data during data-drive phases, the method comprising the steps of:

providing a data-clock signal that indicates the timing of data-drive phases and precharge phases;

providing an indicator signal that indicates valid data is being driven on said precharged bus;

receiving said data-clock signal;

receiving said indicator signal;

delaying said indicator signal;

combining the data-clock signal and the delayed indicator signal into an enable signal, the enable signal being asserted when valid data is Being driven on the precharged bus during a data-drive phase;

enabling the conduction of electrical signals from the precharged bus to the receiving circuit only when the enable signal is asserted.

3. The method as recited in claim 2 wherein the step of delaying comprises the step of delaying the indicator signal through at least one inverter.

* * * * *